May 9, 1933.                P. DUBILIER                1,907,758
                        ELECTRICAL CONDENSER
                         Filed Nov. 5, 1925
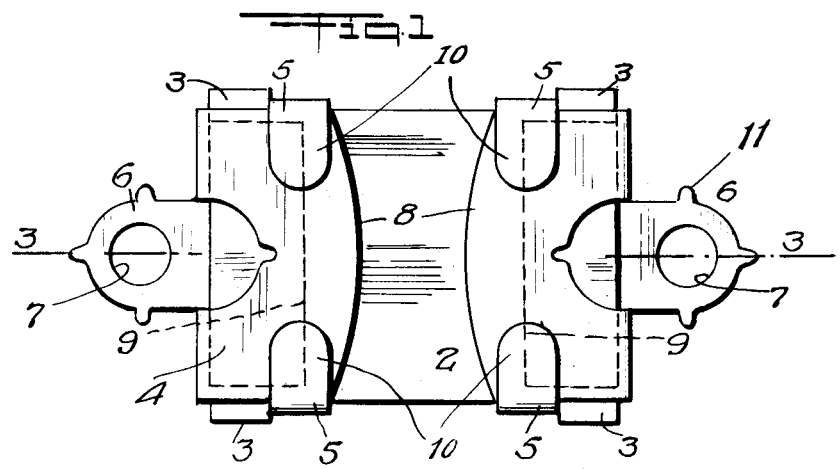
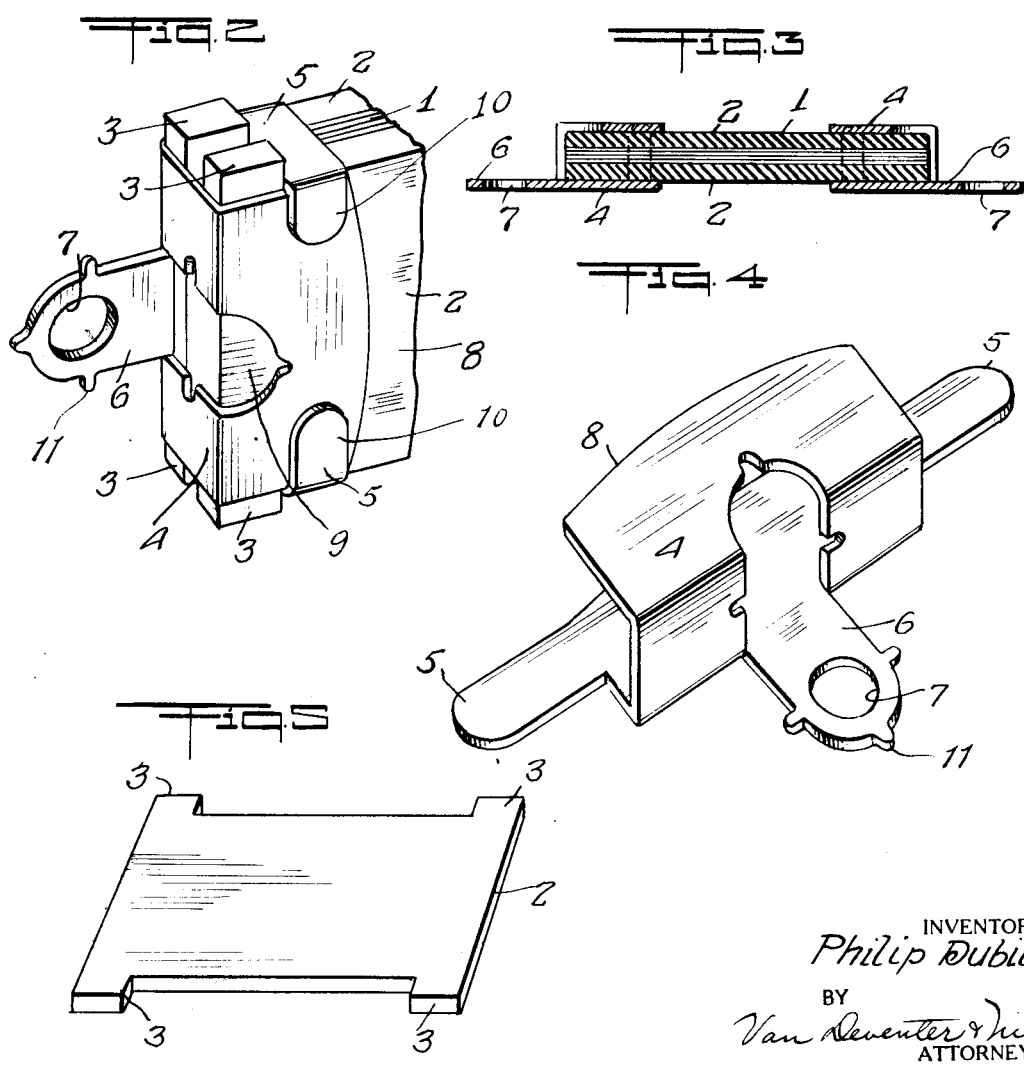
INVENTOR
Philip Dubilier
BY
Van Deventer & Nickel
ATTORNEYS Patented May 9, 1933

1,907,758

UNITED STATES PATENT OFFICE

PHILIP DUBILIER, OF NEW YORK, N. Y., ASSIGNOR TO DUBILIER CONDENSER CORPORATION, OF NEW YORK, N. Y., A CORPORATION OF DELAWARE

ELECTRICAL CONDENSER

Application filed November 5, 1925. Serial No. 66,971.

This invention relates to improvements in electrical condensers suitable for use in radio and other electrical apparatus; and more particularly to an improved compression terminal for a condenser and a method of assembling and attaching the same.

An object of my invention is to provide a condenser which is simple and easy to manufacture at a low initial cost, which allows its component electrically conductive and dielectric elements to be stacked by power driven machinery in any size required, and which after assembly, is so constructed as to be readily connected with the circuit in which it is to be used.

A further object of my invention is to provide a condenser so shaped and having terminal compression members which are in themselves of such form and are so attached that good electrical contact with the conductive elements of the condenser is afforded and accidental shifting or detachment of the terminals from the condenser stack is prevented.

With these and such other objects in view as may hereinafter appear, my invention consists in certain parts and combinations thereof which will be hereinafter fully described and claimed, with the understanding that any or all of the necessary elements comprising my invention may be varied as to details of structure and arrangement, without departing from the spirit of the invention or the scope of the appended claims.

On the drawing:—

Figure 1 is a top plan of a condenser according to my invention;

Figure 2 is a perspective view of the end of such a condenser;

Figure 3 is a longitudinal sectional view along the line 3—3 of Figure 1;

Figure 4 shows in perspective a form of terminal compression clamp; and

Figure 5 is a top view in perspective of one of the insulating cover plates of the condenser.

Like numerals of reference denote the same parts wherever they are shown.

In condensers for radio, the electrostatic capacity must be as nearly constant as possible, and a high degree of electrical conductivity should exist between the electrically conductive elements of the condenser and the terminals thereof.

In the practice of my invention, these advantages are obtained, and further the condenser can be cheaply and quickly built by automatic stacking machinery thus giving an accurately made article to be sold commercially at a relatively low price.

The body or stack 1 of the condenser is built up in the usual manner of electrically conductive elements or sheets, such as metal foil, separated by insulation, such as sheets of mica. The foil and mica are indicated in Figure 3 diagrammatically only, as they may have any convenient size, be in any number, and are assembled by superposing alternate layers in the well-known way. Part of the sheets of foil are allowed to protrude at one end of the body and part at the other. Upon the upper and lower faces of the body of the condenser, relatively thick and stiff cover or holding plates 2 are disposed. These plates are of insulating material, usually die punched and possess a contour similar to that illustrated in Figure 5. They may be rectangular or square, with the edges of their two oppositely located parallel sides partly cut away leaving at each corner a narrow lateral projection 3. The width of the plate between the cut away side edges is the same as that of the mica sheets; hence alinement of the edges of the mica with the cutaway edges of the plates 2 is readily established and maintained.

After assembling the body 1, the protruding ends of the sheets of foil are folded over the ends of one of the plates 2 and the body may then be somewhat compressed. Next, terminals in the form of tightly fitting clamps 4 are forced over the ends of the condenser and grip the protruding and folded ends of the sheets of foil against the plates 2. Each clamp has tongues or fingers 5 at its corners, which are bent down against the sides of the condenser, behind the shoulders afforded by the projections 3 of the plates 2. The clamping members are U-shaped and of stiff, relatively thick metal. Each is provided with a projecting lug 6 that is cut out from the clamp and bent so as to be in a plane with one of the plates 2. Each lug 6 has an aperture 7 to receive an anchorage screw or be affixed to a conductor.

The clamps 4 are as wide as the condenser; hence, when they are put over the ends of the plates 2, they overlie the entire ends of the condenser between the projections 3, thus furnishing a broad, low resistance area of electrical contact with the sheets of foil beneath them.

The tongues 5, which after being forcibly bent around the sides of the condenser behind the projections 3, serve to lock the clamp in place and to prevent detachment of same. In the drawing the contour of edges 8 of the clamps is shown as arched. Each clamp thus projects more over the surface of the plates 2, thereby contributing somewhat to the production of greater uniformity of compression than would be the case if the edges 8 of the clamps were straight lines.

If desired, permanent electrical contact between the foils and terminals after the clamps have been mounted on the condenser, may be assured by filling with solder the apertures 7 left in the clamps on bending out the lugs 6, and thus uniting the foils and the clamps together to make a continuous conductor of low ohmic resistance.

The sheets of foil protruding at the ends of the condenser and folded down on one of the plates 2, under the clamps 4 are indicated at 9 in Figures 1 and 2.

As shown clearly in the drawing, each clamp 4 has only two tongues 5 which extend from adjacent corners on opposite sides of the clamp. That is to say, with reference to Figure 4, for example, the tongues 5 extend from the corners on the part of the clamp, which is the bottom thereof, in this view; and the two clamps are affixed to the condenser in such a manner that the parts of the clamps which carry these tongues lie in the same plane and engage the same plate 2. The tongues are long enough to extend across the sides of the condenser behind the projections 3 and then have their ends bent over upon the opposite part of the clamp to which they are attached. The extremities of the tongues 5 of each clamp thus bent down upon the opposite part of the clamp to which they are attached, are indicated at 10 on the drawing and the tongues 5 thus enable the clamps to grip the ends of the condenser securely between them and hold the sheets of mica and metal foil in the condenser in firm contact over their entire area. As is commonly done in this class of devices, one half of the metal foils will be insulated from the other half, one half being in contact with a clamp at one end of the condenser, and the other half being in contact with the metal clamp 4 at the opposite end, so that the condenser can be connected in circuit by uniting terminals to the lugs 6. These outturned lugs 6 may have projections or tabs 11 for convenience in soldering connectors to the condenser if desired.

Having described my invention, what I believe to be new and desire to secure and protect by Letters Patent of the United States is:—

1. A condenser comprising a body with cover plates for the opposite faces of the body, each plate having a projection at each corner extending out from the side of the plate beyond the body and clamping members for the body, each member being U-shaped to fit over an end of the condenser and having tongues projecting from each side in line with each other, said tongues being bent down over the sides of the condenser behind the corners of the cover plates and over upon the opposite parts of said members to make the clamps grip the condenser securely between them and provide positive interlocks between the clamps and the condenser.

2. A condenser comprising a body with a cover plate having projections extending laterally therefrom, and U-shaped clamping members engaging the opposite ends of said body and said plate, each of said members having tongues bent down behind the projections and over a leg of the member to exert pressure thereon.

3. A condenser comprising a body with cover plates upon its opposite faces, one or more of said plates having a projection extending laterally therefrom, the projections being located at the opposite ends of the condenser, and U-shaped clamping members enclosing the opposite ends of the condenser each of said members, having tongues bent down behind said projections and over a leg of the member to exert pressure thereon and on the condenser elements.

4. A condenser comprising a stack, cover plates for the stack, at least one of said plates having projections extending therefrom, and U-shaped metal clamping members for the condenser, one side of each of said members having metal tongues extending therefrom and bent down behind the projections in such manner as to positively lock the clamping members in position, said tongues extending across the edge of the stack and engaging the opposite sides of the members to prevent the clamp from spreading.

5. A condenser comprising a stack interposed between cover plates, the plates having projections extending from their edges, U-shaped metallic clamp for engaging the cover plates to clamp the assembly, said clamp having deformable tabs extending from one of the legs of the clamp and bent down over the opposite leg of the clamp to maintain clamping pressure on the stack, said tabs also being adapted to engage behind the projections extending from the cover plates in order to provide a positive interlock between the clamp and cover plates, said clamp also having an extending tab for connecting the condenser in circuit.

In testimony whereof I affix my signature.

PHILIP DUBILIER.